Figure 1:
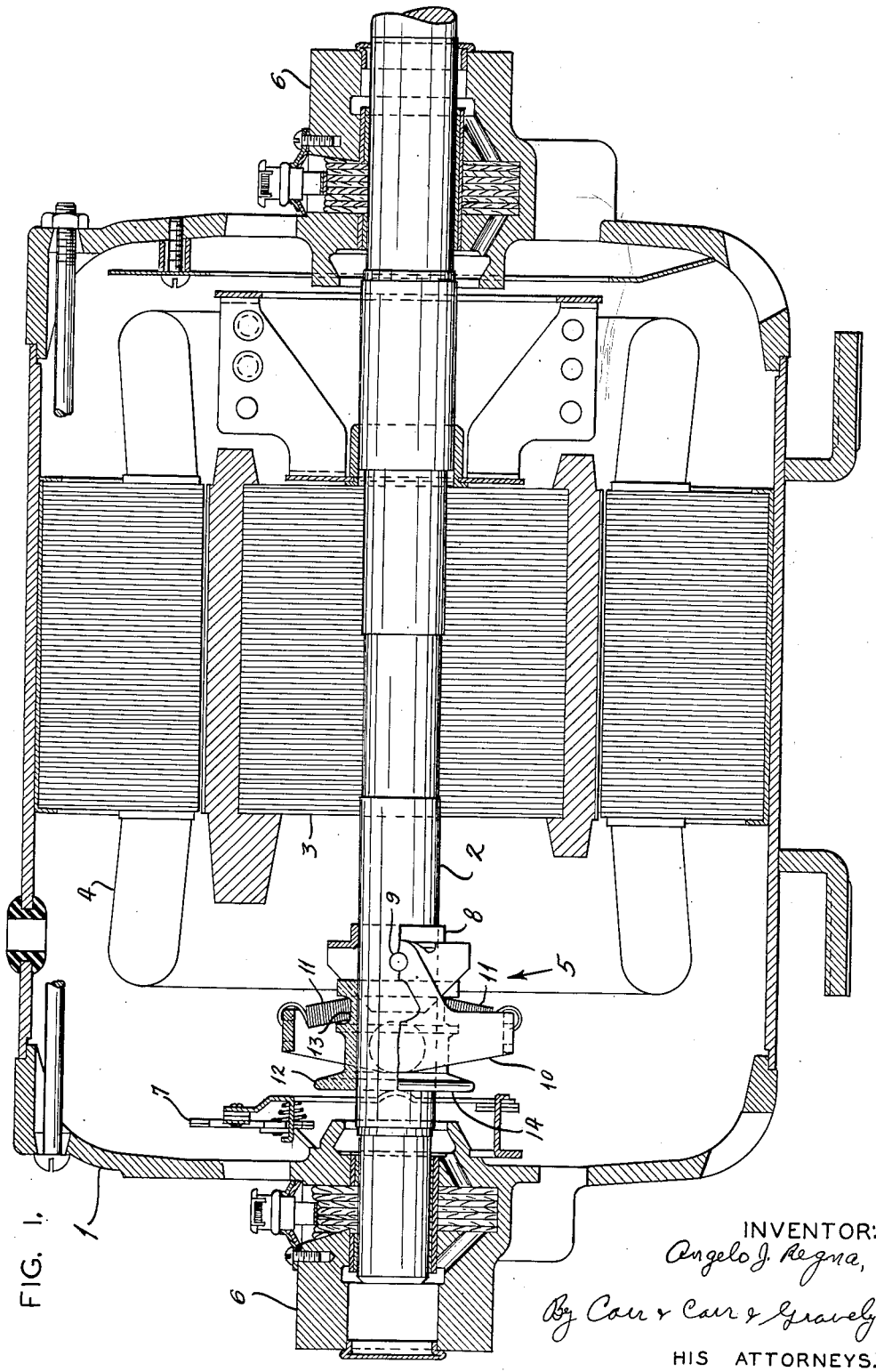

March 10, 1953 A. J. REGNA 2,631,026
DELAYED-ACTION GOVERNOR FOR ELECTRIC MOTORS
Filed April 25, 1949 3 Sheets-Sheet 2

INVENTOR:
Angelo J. Regna,
By Carr & Carr & Gravely,
HIS ATTORNEYS.

Patented Mar. 10, 1953

2,631,026

UNITED STATES PATENT OFFICE 2,631,026

DELAYED-ACTION GOVERNOR FOR ELECTRIC MOTORS

Angelo J. Regna, St. Louis, Mo., assignor to Wagner Electric Corporation, St. Louis, Mo., a corporation of Delaware Application April 25, 1949, Serial No. 89,406

2 Claims. (Cl. 264—15)

This invention relates to electric motors and is more particularly directed to a governor device for certain types of alternating current motors requiring a rapid change in their internal circuit conditions after a predetermined critical speed is reached. The successful operation of certain single phase alternating current electric motors depends upon some automatic means for changing the electrical circuit thereof from that used in starting the motor to that used while the motor is in normal running condition. The changeover from the starting to running connection is usually performed by a switch which is automatically operated by a speed responsive device or governor mechanism mounted on the motor shaft. Many types of governor mechanism have been produced but each has heretofore had limitations which made its use undesirable, the more important of which are the high cost, large space requirements, sluggish operation, high power demands for operating the switch at the desired speed and complicated structures. The governor mechanism constituting the subject of this invention overcomes these limitations and the primary object of the invention is to provide a governor for an electric motor whose radially movable weighted parts, when rotating at the critical speed, causes the peripheral speed of their centers of gravity to change more rapidly than the accompanying changes of speed of rotation of the shaft to which said governor is attached.

Another object is to produce a governor weight for an electric motor that occupies a minimum of space commensurate with the force exerted thereby.

The invention consists in the provision of a governor for an alternating current motor that is capable of actuating a change-over switch or the brush mechanism for a repulsion induction motor by an axial movement of a part mounted on the motor shaft and which has a pair of spring restrained weighted members pivotally secured to the rotor shaft, the restraining springs being connected to the part to be moved axially along the shaft, the weighted parts and the springs being so proportioned that the weighted parts will move radially outwardly with a snap action, thereby quickly opening and closing the switch or retracting and applying or lifting the brushes.

Figure 2:
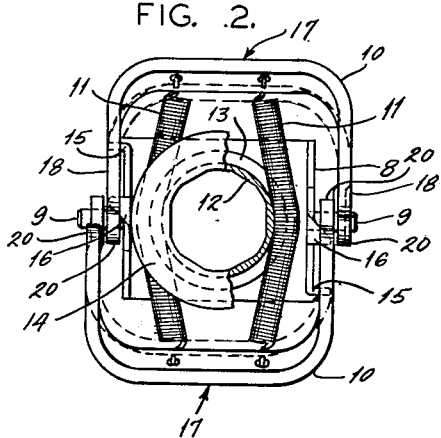
Figure 5:
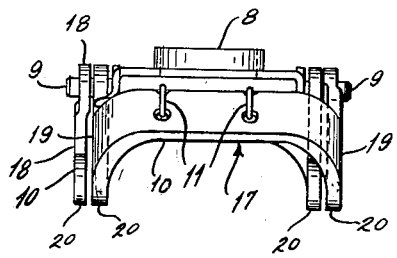
Figure 8:
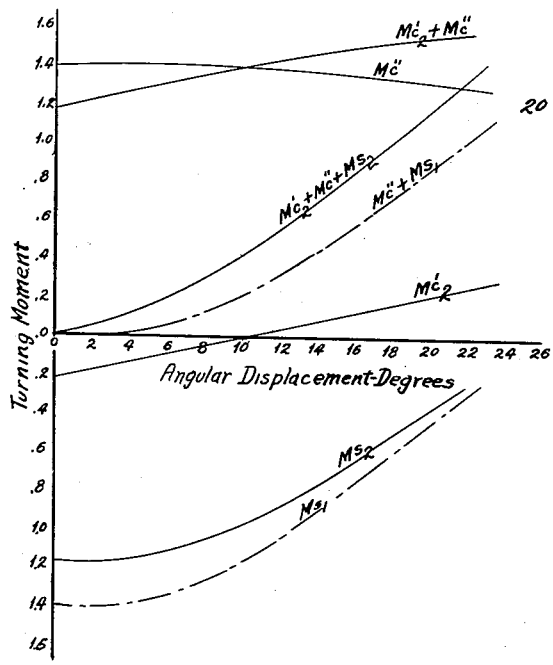
Figure 3:
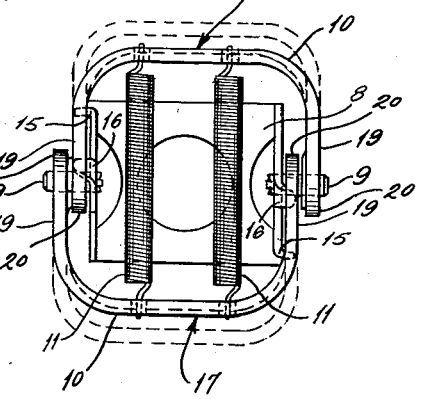
Figure 4:
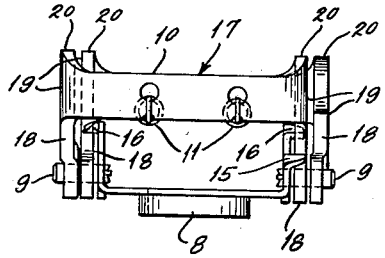
Figure 6:
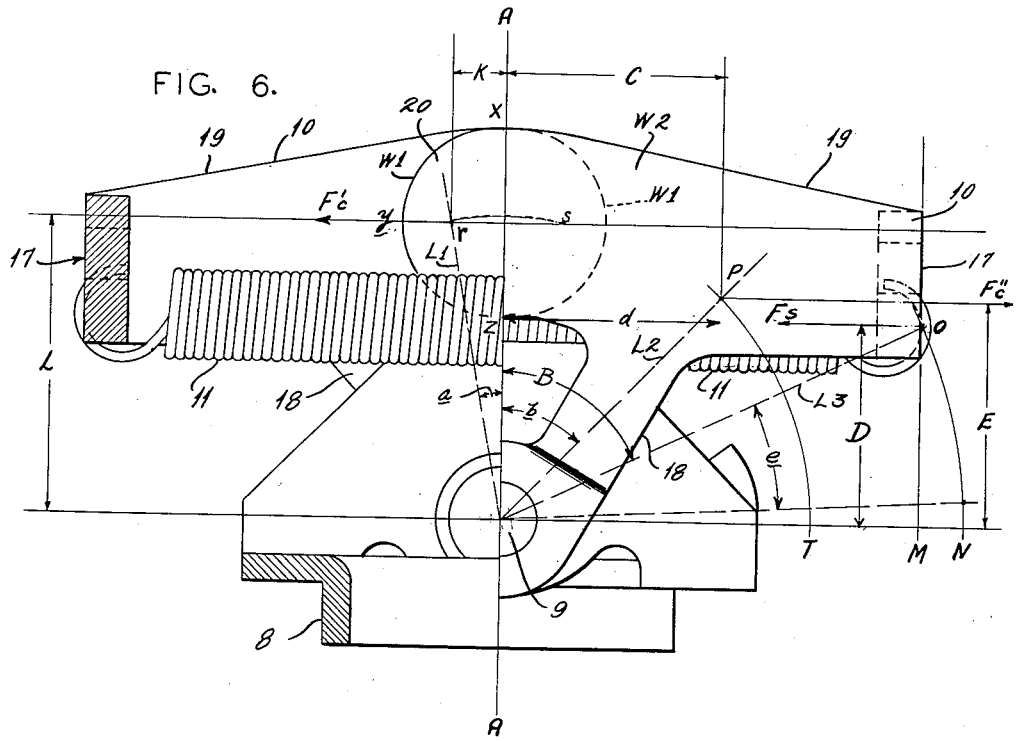
Figure 7:
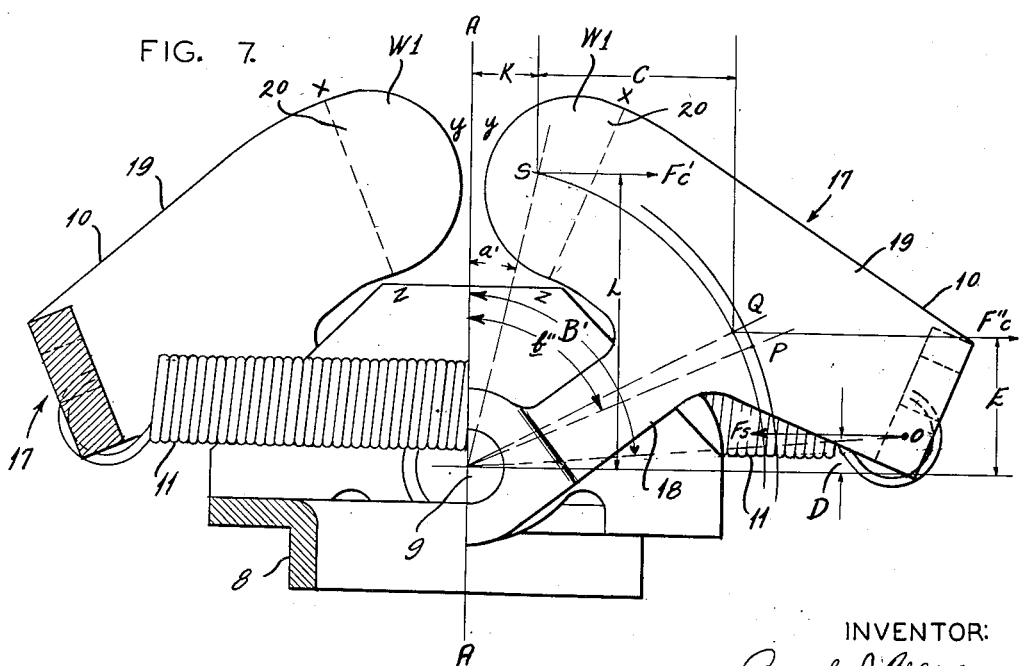

In the drawings:

Fig. 1 is a sectional view of an electric motor embodying the invention,

Fig. 2 is a front end view of the governor mechanism with the hub partly cut away to show the position assumed by the governor springs when the weights are in their open position, Fig. 3 is a plan view of the governor weight mechanism minus the switch operating hub, Fig. 4 is a side elevational view of the mechanism of Fig. 3 with the governor weights in low speed position, Fig. 5 is a view similar to Fig. 4 but with the governor weights in high speed position, Fig. 6 is an end view, partly in section, of the governor weights in the low speed position, Fig. 7 is a view similar to Fig. 6 but with the governor weights in high speed position; and Fig. 8 is a typical speed-moment diagram for the governor illustrated.

The invention is embodied in a motor 1 provided with a rotor shaft 2 on which a rotor 3 is mounted, the shaft being supported in suitable bearings 6. A governor 5 is mounted on shaft 2 and a switch 7 for making and breaking the circuit for the starting winding (not shown) in motor 1.

The governor mechanism 5 consists of a governor weight support 8 mounted on motor shaft 2 adjacent to rotor 3. Hinged to the governor weight support 8, by means of pins 9, are governor weights 10. Two springs 11, each having their ends fastened to each of the governor weights 10, respectively, serve a dual purpose, one of which is to produce the necessary restraining force on the governor weights and the other to carry the governor weight hub 12. The axially movable governor weight hub 12 surrounds the shaft 2 and is provided with a peripheral circumferential groove 13 in which springs 11 are seated for insuring the correct axial movement and position of said hub on the shaft. The hub has a flat face 14 that contacts the non-rotating switch mechanism 7 for correctly switching the motor circuits. Figs. 1 and 4 show the low speed position of the weights 10 and Figs. 2 and 5 show the high speed position of the weights, that is, with the arm 18 for weights 10 in contact with stops 15 (Figs. 2 and 3) on the governor weight support 8. The stops 16 on support 8 limit the travel of the governor weight in the other direction.

Each of the weights 10 consists of a substantially U-shaped member 17 whose side bars 19 are spaced sufficiently for spanning the shaft 2 and the weight support 8. The bars 19 of the U 17 have arms 18 secured thereto that are pivoted to pins 9. Extensions 20 project beyond the junction of bars 19 with arms 18, and when the weights are in low speed position, a part of each weight 20 projects past the axis of rotation of the shaft, for reasons to be hereinafter set forth.

The operation of spring restrained governor weights differs materially from fly ball governors used for controlling steam engines, etc. The centrifugal force offered by any body being rotated about an axis is determined by the formula $$F_c = .00034\ Wrn^2$$

where $F_c$ = centrifugal force in pounds.
$W$ = weight of the body in pounds.
$r$ = perpendicular distance in feet from the axis of rotation to the center of gravity of the body.
$n$ = revolutions per minute of body about the axis of rotation.

This equation is correct for a body that is symmetrical to two perpendicular axes, one of which is parallel to the axis of rotation and it is sufficiently accurate to be used in the following analysis.

The force offered by a coil spring, as shown, upon being elongated obeys the equation $$F_s = (L - L_0)\ R$$

where $F_s$ = force exerted by extended spring in pounds
$L$ = extended length of spring in feet
$L_0$ = free length of spring in feet
$R$ = spring rate coefficient i. e. change in exerted force per unit extension of spring.

It will readily be seen that the action of any governor weight of this type will depend upon the relative change in moment of the centrifugal force to the moment of the spring force for any portion of the weight at a fixed speed and, therefore, the greater the change therebetween, the better the mechanism.

Calculation of the changes in moments acting on the governor weight at a given speed is dictated by the speed-torque characteristics of the motor under both of its operating conditions such that the weights have a moment due to centrifugal forces acting thereon which will overcome a moment due to the spring force.

Attention is now directed to Figs. 6 and 7 for developing the characteristic curves of Fig. 8. It will be noted in Fig. 6, which shows the governor weights in the low speed position, that there are three forces acting, namely, the centrifugal force $F'_c$ due to the weight $W_1$ defined by the area $x$—$y$—$z$ of the governor weight 20 disposed to the left of the axis of rotation A—A that acts on its center of gravity at point $r$ toward the left of the axis of rotation. The second force is the centrifugal force $F''_c$ caused by the weight $W_2$ of that part of the governor weight disposed to the right of the axis of rotation A—A and acts through its center of gravity at point P toward the right. The third force acting on the governor mechanism is the force $F_s$ caused by the spring which acts toward the left from a position at the point O. Connecting each of the action points $r$, P and O with the hinge point 9, as shown by the dotted lines, creates angles between the axis of rotation and the lines through the action points as follows: "$a$" between the lines $L_1$ and the line A—A; "$b$" between the line $L_2$ and the line A—A; and "$B$" between the line $L_3$ and the line A—A. Having defined the forces, the lever arm is described on which each force acts to produce the moments in the system. In the position shown in Fig. 6, it will be noted that the moment produced by weight $W_1$ is $M'_c = F'_c L_1 \cos a$. For the weight $W_2$ is found $M''_c = F''_c L_2 \cos b$. For the spring 11 $M_s = F_s L_3 \cos B$. It is obvious, however, that the centrifugal forces $F'_c$ and $F''_c$ are also functions of the angles $a$ and $b$, respectively, such that $F'_c = W_1 K L_1 \sin a$ and $$F''_c = W_2 K L_2 \sin b$$

Substituting these values in the moment equations above produces $$M'_c = \frac{W_1 K}{2} L_1^2 \sin 2a$$

and $$M''_c = \frac{W_2 K}{2} L_2^2 \sin 2b$$

The force $F_s$ is dependent upon the condition of the spring 11 which has a finite unstressed length $L_0$. This force is determined by the formula $F_s = R\ (L_3 \sin B - L_0)$ therefore the equation for the spring moment $M_s$ becomes $$M_s = R L_3\ (\tfrac{1}{2} L_3 \sin 2B - L_0 \cos B)$$

It is clear therefore that the effective moment acting on the governor weight is the algebraic sum of the moments defined above. Obviously, at the selected speed of operation of the governor mechanism the moment $M_s$ must just equal or be very slightly less than the sum of the moments $M'_c$ and $M''_c$.

When the governor weight has started to move the effective moment which is the result of the change of the angle of the governor weight with the axis of rotation, can be calculated. The governor weight can open or move through an angle which is equal to $B' - B = e$ (Figs. 6 and 7) with a consequent change in the centrifugal and spring forces. Likewise new moments correspond to this open position. The moment $M'_c$, it will be noted, now acts in the opposite direction, that is to the right, while the moment $M''_c$ has decreased only slightly in magnitude. By means of the shortening of the lever arm of the spring force $F_s$, the moment $M_s$ has decreased almost to zero. Plotting the moments acting on the governor weight at its different transitional positions, we get the solid curves of Fig. 8 in which it will be noted that the curve $(M'_{c2} + M''_c + M_{s2})$ representing the effective moment is diverging from the horizontal axis at a rapid rate, thus giving a "snap" action to the mechanism operated thereby. Attention is directed to the fact that the curve $M'_{c2} + M''_c$ is materially steeper than the curve $M''_c$. This condition is responsible for the rapid divergency of the final curve $M'_{c2} + M''_c + M_{s2}$ from the horizontal axis.

The dotted set of curves in Fig. 8 are based upon the condition that there is no part of the governor weight initially located to the left of the line A—A. Attention is directed to the curve labeled $M''_c + M_{s1}$ which shows the total effective moment acting on the mechanism. That part of this curve lying adjacent the zero angular displacement point is seen to diverge very slowly from the horizontal axis which is an unfavorable condition in that it discloses that there is insufficient force available to operate the motor switch until a further increase in speed takes place, thus not resulting in the necessary "snap" action referred to above. This condition is undesirable since malfunctioning of the motor results.

Comparison of curves $M'_{c2} + M''_c + M_{s2}$ and $M''_c + M_{s1}$ shows the advantage of being able to change a part of the centrifugal force produced by a given governor weight from one side of the axis of rotation to the other.

There are several ways in which the rate of divergence from the horizontal axis of the moment curves may be altered, the more important of which are:

1. Maintaining the length of the spring substantially constant while the center of gravity of the weight moves away from the axis of rotation;

2. Making the rate of the spring such that it increases its force with increase in length much slower than the increase of centrifugal force produced by the weight;

3. So design the weight that at the closed or inoperative position the mass is so distributed about the axis of rotation as to constitute two centrifugal forces acting in opposite directions, one of which is larger than the other.

A further condition is that the smaller centrifugal force be in the direction of action of the spring force and additive thereto. When the speed of rotation increases sufficiently for the larger centrifugal force to overcome the restraint placed upon the weight by the combined action of the smaller centrifugal force and the spring, the weight begins to move away from the above defined closed or inoperative position. Such movement causes the part of the mass which produces the smaller centrifugal force to be transferred to the side of the axis of rotation upon which it will add its force to the larger centrifugal force, thus performing a dual purpose, namely, that of decreasing the so-called negative centrifugal force and leaving only the spring force to counteract the positive centrifugal force and at the same time increasing the so-called positive centrifugal force to thereby produce a "snap" action of the governor weights in their movement from closed to open position and vice versa.

The principle of operation described above and the application of forces on a preferred design of the governor is specifically applied to Figs. 3 to 7, inclusive, substantially as follows:

Fig. 3 is similar to Fig. 2 but with the hub 18 removed. The addition of the hub adds forces which have effective components all of which can be considered to be included in and represented by springs 11 and, therefore, will be omitted from this discussion for purposes of clarity.

The hinge pins 9 are disposed below the lines of action of the springs and the several centers of gravity involved so that it becomes desirable and necessary to speak of turning moments instead of spring produced forces and centrifugal forces. The turning moment of a force is the product of the force and the perpendicular distance between it and the center of rotation. To simplify the calculations reference is made to moments produced by centrifugal force as $M_c$ and to moments produced by springs as $M_s$ as established in the above calculations.

Referring to Fig. 6, it is assumed that the governor weights are rotating about the axis A—A at such speed as to allow the weights to be in the inoperative or closed position shown. The forces acting on one weight will be computed and then by symmetry, a factor of 2 can be applied for obtaining the condition for the entire governor weight assembly.

It can be easily shown that the precise method of calculating the resultant moment due to centrifugal force of an irregularly shaped body is by integration of the moments of the individual tiny elements of volume of the body. However, sufficient accuracy can be obtained in the present case by dividing the governor weight into two elements of volume—one located to the left of the line A—A (Fig. 6) and the other located to the right of this line—and applying the formula $M=(.00034\ Wrn^2)\ L$ (moment) to the center of gravity of each of these parts. This is precise only when applied to bodies which are symmetrical to at least one of two axes which are at right angles and about one of which the body in question rotates.

Applying the general formula set forth above to the specific illustration—

$F''_c = .00034\ W_1 k n^2$ and acts to the left as shown, where $W_1$=combined weight in pounds of the two parts $W_1$ of weight 20 of one of the weights 10 lying to the left of the line A—A (Fig. 6) or the area $x$—$y$—$z$.

$k$=distance in feet from A—A to $C'_g$ of area $x$—$y$—$z$.

$n$=R. P. M. of governor weight at its initial speed.

$F_s$=force exerted by the two springs 11 on weight 10 and applied at point O.

$F''_c = .00034\ W_2 d n^2$ acts to the right as shown, where $W_2$=weight of that part of the governor weight to the right of axis of rotation A—A.

$d$=distance from axis of rotation to c. g. of $W_2$ or to point P.

We may now compute the turning moments of these forces about the point 9—

$$M_c = F''_c \cdot (E) - (F_s \cdot (D) + F'_c \cdot (L))$$
$$= M''_c - (M_s + M'_c)$$

We see from this equation that there can be no possible movement of the weight 10 until the quantity $F''_c(E)$ is larger than the quantity $F_s \cdot (D) + F'_c \cdot (L)$.

A speed $n$ must be considered such that $F''_c(E)$ just overcomes the mounted $F_s(D) + F'_c(L)$. At this speed the weight begins to swing about pins 9. The force $F_s$ of springs 11 continues to act in a horizontal direction. The point of application O of this spring force begins to move along the arc O—N and the spring to elongate by the horizontal distance between the line O—M and the arc O—N. The center of gravity c. g.' begins to move along the arc $r$—$s$ reducing the distance $k$ and thus the centrifugal force $F'_c$. The center of gravity of $W_2$ begins to move along the arc P—T thus increasing its distance $d$ from the axis of rotation, thereby increasing the centrifugal force $F''_c$.

Having now analyzed the changes in forces, it is necessary to observe the net change in moments about the pin 9. The moment $M_{s2}$ of the spring force decreases very rapidly because the distance D decreases very rapidly with movement of the weight. The moment $M''_{c2}$ of the centrifugal force due to $C''_g$ decreases with increments of movement of the weight since the radius of rotation $d$ increases at a lower rate than the distance E decreases. Therefore $M''_{c2} = .00034\ W_2 (d+\Delta d)\ n^2\ (E-\Delta E)$ and decreases with increase of angle B'. The moment $M'_c$ which at the beginning of the movement is opposed to the moment $M''_{c2}$ decreases very rapidly since the distance $k$ is substantially on the arc $r$—$s$ and the distance L remains substantially constant. Thus the resultant centrifugal force moment $$M''_{c2} + M'_{c2}$$

increases with increments of movement. As the spring moment $M_{s2}$, which opposes the resultant centrifugal force moment, decreases with increments of movement, it is evident that the effective moment rapidly increases with increasing movement. It is apparent therefore that as the critical speed is reached, the weight begins to move rapidly from the inoperative or closed to the operative or open position. It is seen from the above that due to the changing of the direction of the moment $M'_{c2}$ the weight moves from closed to open position with a "snap" action.

What I claim is:

1. In a governor device for an electric motor having a rotatable shaft, a rotatable governor mechanism operable at a predetermined critical speed mounted on the rotatable shaft and comprising a sleeve on said shaft, a support secured to said shaft, a pair of U-shaped members having a weight on the outer end of each side thereof, means for pivoting said U-shaped members to said support, a pair of springs engaging said sleeve and secured to said U-shaped members and biasing said weights so that a portion of each weight is disposed on opposite sides of the longitudinal axis of said rotatable shaft, said weights adapted to be moved suddenly outwardly by centrifugal force when said shaft rotates above the critical speed so that they are disposed at one side of said axis of said shaft, said outwardly moving weights moving said sleeve along said shaft.

2. A governor mechanism for a rotatable shaft comprising a support secured to said shaft, a pair of U-shaped members pivoted on said support, said pivot on said support having an axis at right angles to and intersecting the axis of rotation of said shaft, a pair of springs attached to said U-shaped members for biasing said last mentioned members to their inoperative position, said springs arranged substantially perpendicular to said axis of rotation of said shaft member and said pivotal axis of said U-shaped members; and a cylindrical hub slidably received on said shaft, said hub being interposed between said springs and engageable therewith, said U-shaped members being adapted to pivot outwardly by centrifugal force when said shaft is rotated above a critical speed for sliding said hub axially of said rotatable shaft.

ANGELO J. REGNA.

REFERENCES CITED

The following references are of record in the file of this patent:

UNITED STATES PATENTS

| Number | Name | Date |
|---|---|---|
| 752,683 | Keller | Feb. 23, 1904 |
| 1,102,069 | Ormston | June 30, 1914 |
| 2,141,772 | Stadler | Dec. 27, 1938 |
| 2,485,514 | Sturrock | Oct. 18, 1949 |